(12) United States Patent
Huang et al.

(10) Patent No.: US 8,849,593 B2
(45) Date of Patent: Sep. 30, 2014

(54) GAS APPLIANCE AND METHOD OF CONTROLING THE GAS APPLIANCE

(75) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Kuan-Chou Lin, Taichung (TW);
Yen-Jen Yen, Yunlin County (TW)

(73) Assignee: Grand Mate Co., Ltd., Taichung (TW)

( * ) Notice: Subject to any disclaimer, the term of this patent is extended or adjusted under 35 U.S.C. 154(b) by 419 days.

(21) Appl. No.: 13/235,259

(22) Filed: Sep. 16, 2011

(65) Prior Publication Data
US 2013/0071797 A1  Mar. 21, 2013

(51) Int. Cl.
*G01F 17/00* (2006.01)
*G01L 9/14* (2006.01)
*F23N 1/00* (2006.01)
*F16K 31/02* (2006.01)
*F23N 1/02* (2006.01)
*F23N 5/18* (2006.01)

(52) U.S. Cl.
CPC ............. *F16K 31/02* (2013.01); *F23N 2041/04* (2013.01); *G01L 9/14* (2013.01); *F23N 1/00* (2013.01); *F23N 2035/12* (2013.01); *F23N 2005/185* (2013.01); *F23K 2401/201* (2013.01); *F23N 1/022* (2013.01); *F23N 2025/06* (2013.01); *F23N 5/18* (2013.01); *F23N 1/02* (2013.01)
USPC ................ 702/50; 702/49; 702/57; 702/136; 702/138

(58) Field of Classification Search
USPC .................. 702/49, 57, 136, 138; 431/12, 89; 137/487.5, 488; 73/1.57, 19.05, 728
See application file for complete search history.

(56) References Cited

U.S. PATENT DOCUMENTS

| | | | | |
|---|---|---|---|---|
| 4,643,394 A | * | 2/1987 | Shimura et al. | 251/129.08 |
| 5,738,076 A | * | 4/1998 | Kim | 123/527 |
| 2010/0074838 A1 | * | 3/2010 | Nakamura et al. | 423/648.1 |

* cited by examiner

*Primary Examiner* — Elias Desta
(74) *Attorney, Agent, or Firm* — Tracy M. Heims; Apex Juris, pllc

(57) ABSTRACT

The present invention provides a water heater, including a combustor, a gas pipe, a combustion controller, a pressure gauge, and a controller. The gas pipe supplies the combustor gas. The combustion controller controls combustion of the combustor. The pressure gauge detects a gas pressure in the gas pipe and generates an electrical signal in association with the gas pressure. The controller is electrically connected to the gas gauge and the combustion controller to receive the electrical signal from the gas gauge and controls the combustion controller according to the electrical signal to adjust the combustion of the combustor. In addition, the present invention further provides a method of controlling the water heater.

7 Claims, 5 Drawing Sheets

GAS APPLIANCE AND METHOD OF CONTROLING THE GAS APPLIANCE

BACKGROUND OF THE INVENTION

1. Field of the Invention

The present invention relates generally to a gas appliance, and more particularly to a gas appliance and a method of controlling the gas appliance.

2. Description of the Related Art

Gas appliances, which are the device burning gas to perform a specific function, such as gas water heater, gas stove, gas clothing dryer and gas fireplace, have a high level of safety issue in home life. However, aging and malfunction are the main problem that causes danger in running of the gas appliance, and they have to be detected immediately and to get fixed or stopped in the following.

Typically, some data of the gas appliance are detected to ensure the appliance in normal running, such as heat efficiency, gas concentration, gas pressure, and running data of some key elements of the gas appliance. The gas appliance usually is provided with a pressure gauge, such as U-tube gauge and Bourdon-tube gauge, to measure the gas pressure. The U-tube gauge provides water or mercury in a U-shaped tube. The surfaces of the mercury will be at the same level when the pressures on the opposite ends of the U-shaped tube are the same, and there will be a height difference between the mercury surfaces when the pressures are different. One may find the pressure according to the height difference.

The Bourdon-tube gauge has a copper alloy tube, which has an elliptical cross section and is bent into a curved shape. An end of the tube is connected to a connector. The distal end of the tube is closed, and there is a space for the tube to expand. When a pressure is transmitted to the tube 90 through the connector, the curved tube will be extended. A link connects the distal end of the tube and a sector gear. The sector gear is provided with a pointer on a scale to show the value of pressure. In other words, the pressure may deform the tube to move the pointer through the link, and the pressure is directly proportional to the deformation of the tube that the movement of the pointer may indicate the pressure.

There are several drawbacks in the conventional pressure gauges, for example, the U-tube gauge has a poor precision in measurement, and the U-shaped tube usually is made of class which is easy to be broken. Besides, the temperature in the U-shaped tube will affect the precision of measurement. For the Bourdon-tube gauge the temperature affects the precision of measurement also, and the material fatigue of the copper tube is another big problem.

In conclusion, there still are some places in the art of pressure detection for the automatic control of the gas appliance that needs to be improved.

SUMMARY OF THE INVENTION

The primary objective of the present invention is to provide a gas appliance and a method of controlling the gas appliance, which controls the gas appliance to run in high efficiency according to the gas pressure.

According to the objective of the present invention, the present invention provides a gas appliance including a combustor; a gas pipe for supplying the combustor a gas flow; a combustion controller for controlling combustion of the combustor; a pressure gauge connected to the gas pipe to detect a gas pressure in the gas pipe and generate an electrical signal according to the gas pressure; and a controller electrically connected to the pressure gauge and the combustion controller to receive the electrical signal from the pressure gauge and control the combustion controller according to the electrical signal.

The present invention further provides a method of controlling the gas appliance which includes the following steps:

A. Detect a gas pressure in the gas pipe, and generate an electrical signal according to the gas pressure; and B. Control the combustion controller according to the electrical signal to adjust the combustion of the combustor.

Therefore, the present invention may control combustion of the combustor according to the gas pressure, which is detected by the pressure gauge, to increase the combustion efficiency of the gas appliance.

DETAILED DESCRIPTION OF THE INVENTION

Figure 1:
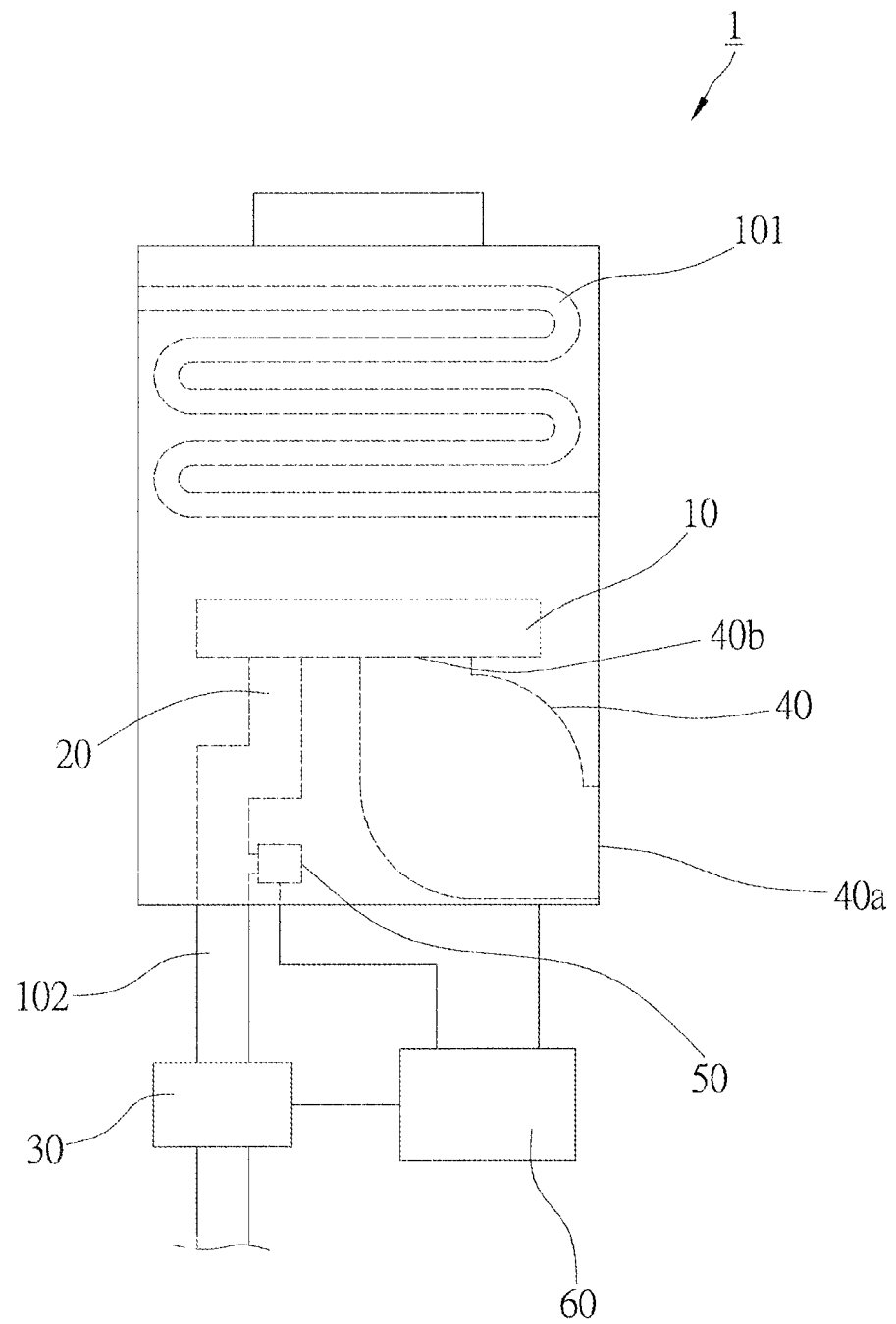
FIG. 1 is a sketch diagram of the gas appliance of a first preferred embodiment of the present invention.

FIG. 1 shows a gas appliance, which is a water heater 1, of the first preferred embodiment of the present invention. The water heater 1 includes a combustor 10, a gas pipe 20, a first combustion controller, a second combustion controller, a gas gauge 50, and a controller 60.

The combustor 10 is under a water pipe 101 to heat water in the water pipe 101.

The gas pipe 20 is connected to an external gas hose 102 to supply gas to the combustor 10.

The first combustion controller is a valve 30 in the present invention. The valve 30 is connected to the gas pipe 20 to adjust a gas flow. The valve 30 is a conventional device, for example, the valve may be the device taught by U.S. Publication no. 20090206291A1 which controls the gas flow rate by current, or other devices to serve the same function.

The second combustion controller is a blower 40 in the present embodiment. The blower 40 is under the combustor 10 to provide an air flow to the combustor 10. The blower 40 has a motor (not shown) therein, an inlet 40a, and an outlet 40b to suck air via the inlet 40a and exhaust it via the outlet 40b. It is known that the speed of the blower 40 is directly proportional to the air flow.

Figure 2:
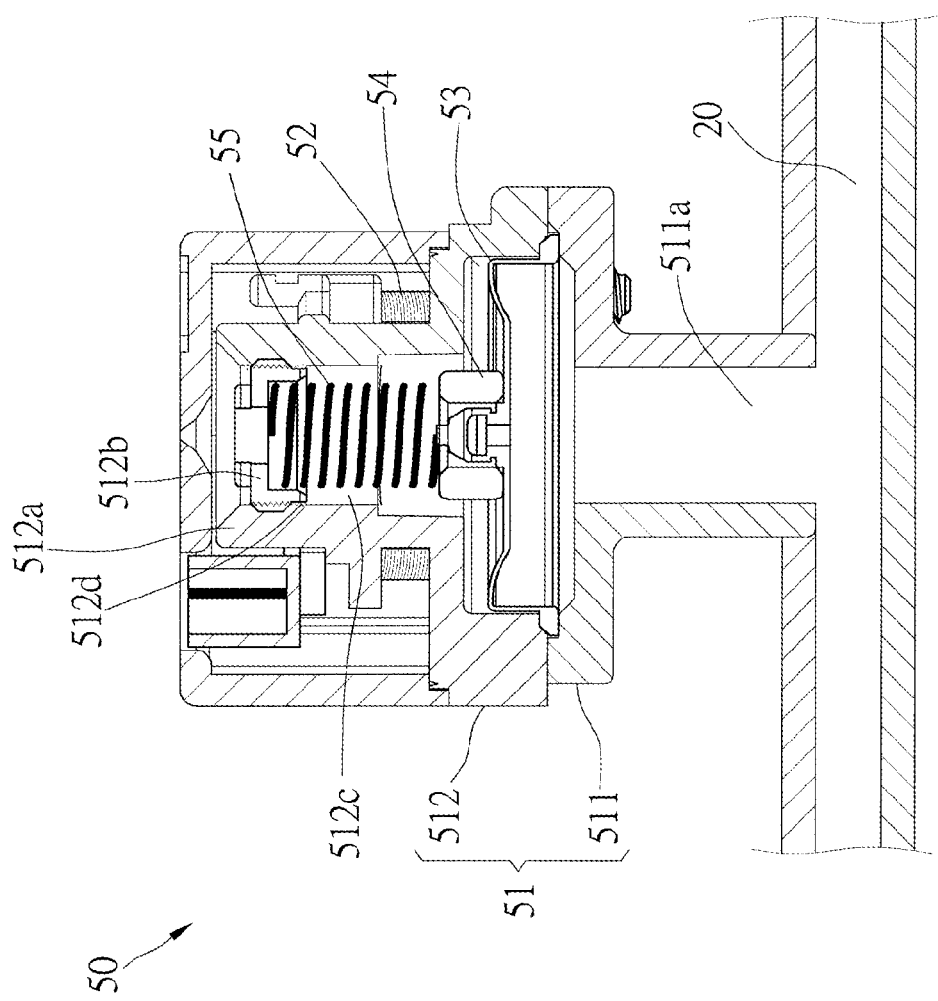
FIG. 2 is a sectional view of the pressure gauge of the first preferred embodiment of the present invention.

As shown in FIG. 2, the gas gauge 50 is connected to the gas pipe 20 to detect a gas pressure in the gas pipe 20. The pressure gauge 50 includes a case 51, a coil 52, a flexible film 53, a magnetic device 54, and a spring 55. The case 51 has a base 511 and a lid 512 engaging the base 511. The base 511 has a bore 511a to connect the gas pipe 20 that gas may enter the case 51 via the bore 511a. The lid 512 has a main member 512a and a knob 512b. The main member 512a has a chamber 512c therein and a threaded hole 512d. The knob 512b engages the threaded hole 512d.

The coil 52 is made of conductor, such as copper, iron, and silver. The coil 52 is received in the chamber 512c of the lid 512 and surrounds the main member 512a.

The flexible film 53 is provided on an inner side of the base 511 to cover the bore 511a that the flexible film 53 may be expanded by the gas.

The magnetic device 54 is received in the chamber 512c and is able to be moved relative to the coil 52. The magnetic device 54 may be moved by the flexible film 53. In the present invention, the magnetic device 54 is a permanent magnet, and, however, it may be an electromagnet or other members with magnetism.

The spring 55 is received in the chamber 512c and has opposite ends urging the knob 512d and the magnetic device 54 respectively that the magnetic device 54 is adjusted by turning the knob 512d.

Figure 3:
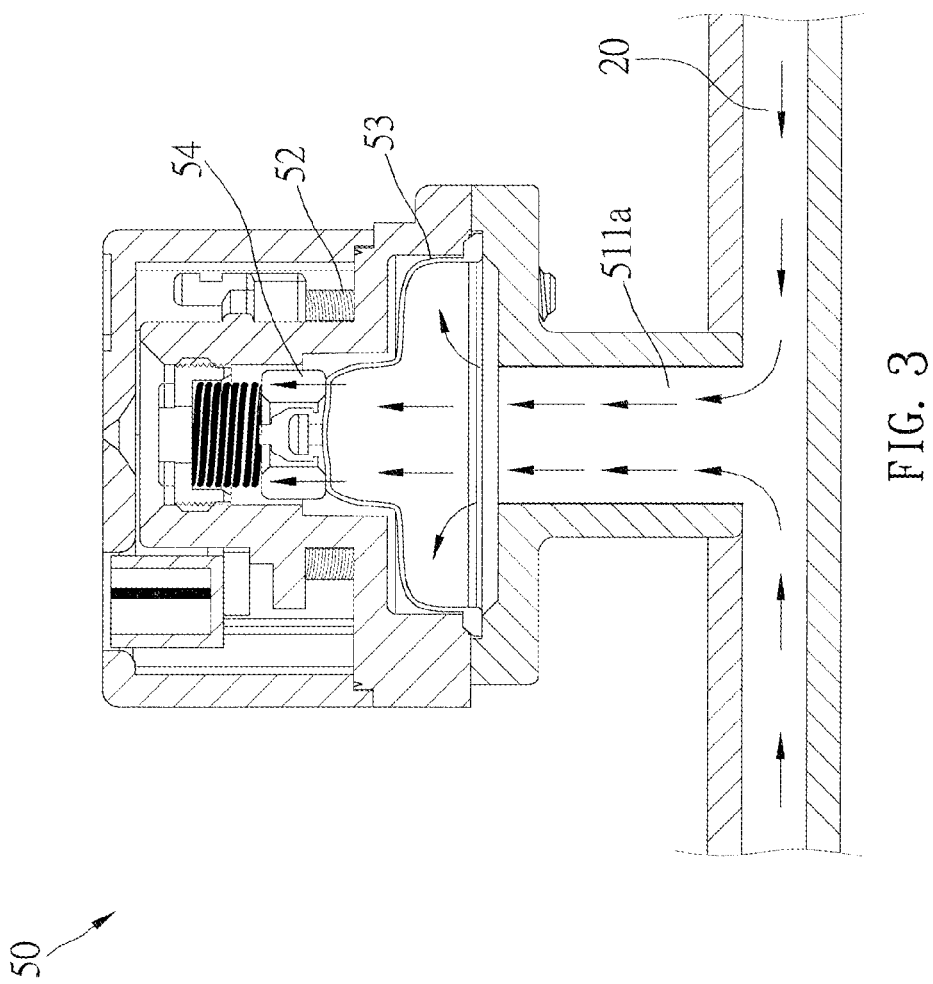
FIG. 3 is a sectional view of the pressure gauge of the first preferred embodiment of the present invention, showing the pressure gauge measuring pressure.

As shown in FIG. 3, the flexible film 53 may be expanded by the gas from the gas pipe 20 to move the magnetic device 54, and the coil 52 generates an electrical signal in association with the movement of the magnetic device 54. The electrical signal is directly proportional to the gas pressure.

The controller 60 is electrically connected to the gas gauge 50, the valve 30, and the blower 40 respectively to receive the electrical signal from the gas gauge 50 and control the valve 30 and the blower 40 according to the electrical signal.

Figure 4:
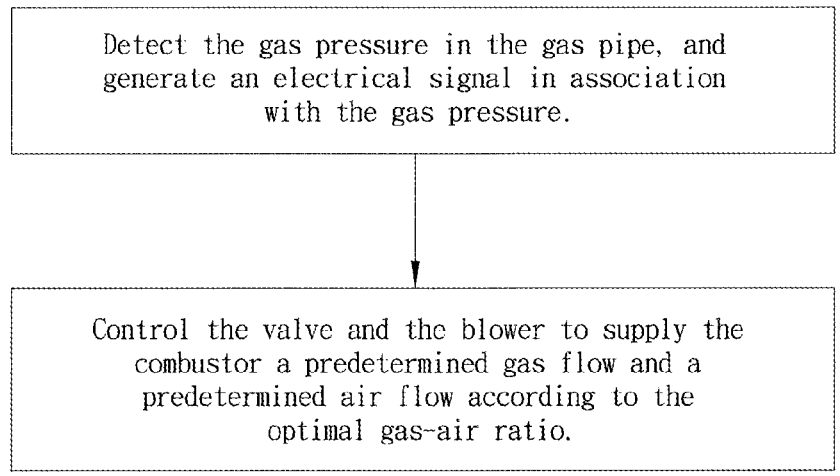
FIG. 4 is a flow chart of the control method of the first preferred embodiment of the present invention.
Figure 6:
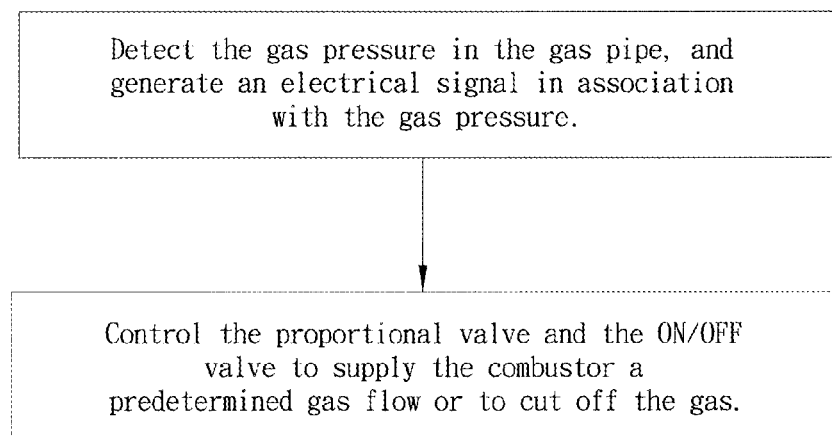
FIG. 6 is a flow chart of the control method of the second preferred embodiment of the present invention.

As shown in FIG. 4, a method of controlling the gas appliance 1 includes the following steps:

A. The gas gauge 50 detects a gas pressure in the gas pipe 20, and generates an electrical signal in association with the gas pressure. In the present embodiment, the gas pressure expands the flexible film 53 to move the magnetic device 54 relative to the coil 52 that the coil 52 generates the electrical signal proportional to the gas pressure.

B. The controller 60 receives the electrical signal, and controls the gas valve 30 and the blower 40 to supply the combustor 10 a predetermined gas flow and a predetermined air flow according to the electrical signal. The gas flow and the air flow are in a relationship of an optimal air-gas ratio.

The method of the present invention controls the valve 80 to provide the combustor 10 a suitable gas flow according to the gas pressure that may increase the heating efficiency and decrease carbon monoxide because of incomplete combustion.

Figure 5:
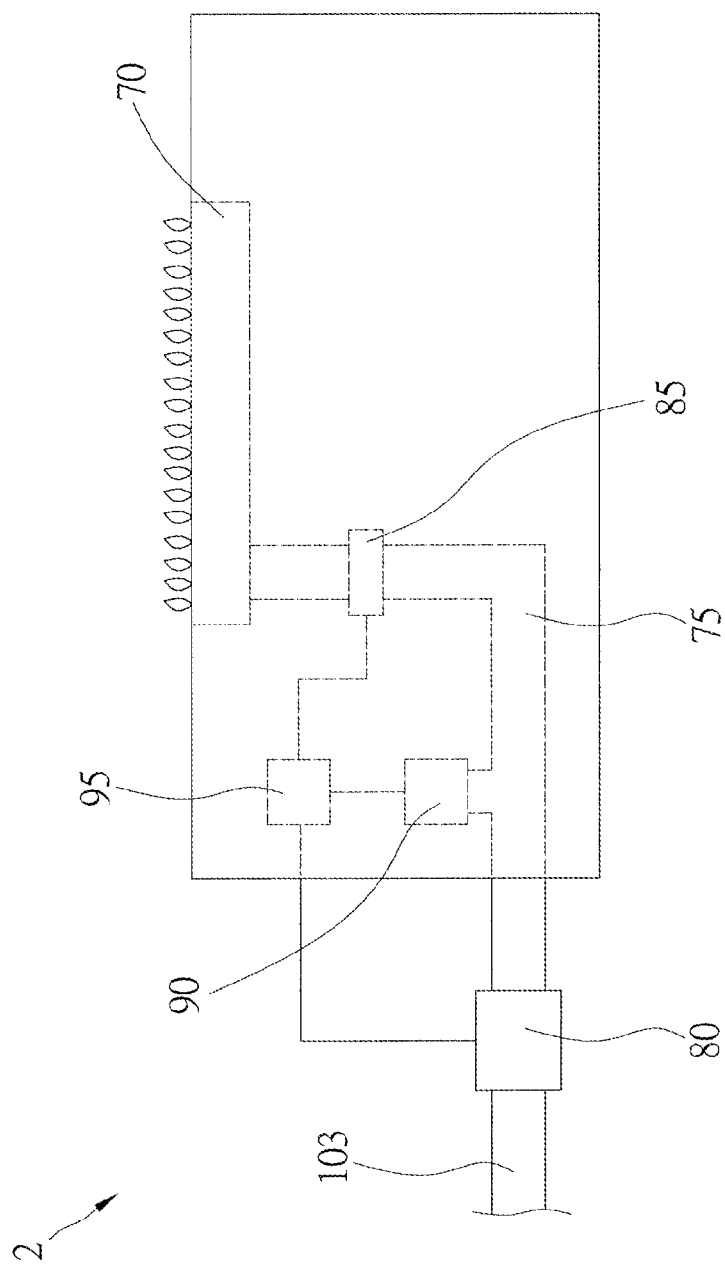
FIG. 5 is a sketch diagram of the gas appliance of a second preferred embodiment of the present invention.

The present invention provides another water heater 2, as shown in FIG. 5, including a combustor 70, a gas pipe 75, a first combustion controller, a second combustion controller, a pressure gauge 90, and a controller 95.

The combustor 70 generates flame by burning gas.

The gas pipe 75 is connected to the gas pipe 103 to supply the combustor 70 gas.

The first combustion controller is a proportional valve 80 in the present embodiment connected to the gas pipe 75 to control a gas flow supplying to the combustor 70.

The second combustion controller is an ON/OFF valve 85 in the present embodiment connected to the gas pipe 75 to turn on or turn off the gas supply.

The pressure gauge 90 is connected to the gas pipe 75 to detect a gas pressure in the gas pipe 75 and generate an electrical signal in association with the gas pressure. The pressure gauge 90 is the same as the device of above, so we do not describe it again.

The controller 95 is electrically connects pressure gauge 90, the proportional valve 80, and the ON/OFF valve 85 to receive the electrical signal from the pressure gauge 90 and control the proportional valve 80 and the ON/OFF valve 85 according to the electrical signal.

A method of controlling the water heater 2 includes the following steps:

A. The gas gauge 50 detects a gas pressure in the gas pipe 75, and generates an electrical signal in association with the gas pressure.

B. The controller 95 receives the electrical signal from the gas gauge 50, and controls the proportional valve 80 and the ON/OFF valve 85 according to the electrical signal to supply the combustor 10 a predetermined gas flow. In detail, the controller 95 compares the electrical signal with a predetermined range stored in the controller 95 already to control the proportional valve 80 to supply the combustor 10 a predetermined gas flow while the electrical signal is within the predetermined range, and control the ON/OFF valve 85 to cut off the gas flow while the electrical signal is beyond the predetermined range.

Therefore, the present invention may provide the combustor 10 of the gas appliance a high combustion efficiency by controlling the combustion controllers according to the gas pressure. It may reduce the incomplete combustion and carbon monoxide to avoid accident because of aging or malfunction of the gas appliance.

The description above is a few preferred embodiments of the present invention and the equivalence of the present invention is still in the scope of claim construction of the present invention.

What is claimed is:

1. A gas appliance, comprising:
   a combustor;
   a gas pipe for supplying the combustor a gas flow;
   a combustion controller for controlling combustion of the combustor;
   a pressure gauge connected to the gas pipe to detect a gas pressure in the gas pipe and generate an electrical signal in association with the gas pressure; and
   a controller electrically connected to the pressure gauge and the combustion controller to receive the electrical signal from the pressure gauge and control the combustion controller according to the electrical signal;
   wherein the gas gauge includes a case with a bore to connect the gas pipe, a flexible film provided on the case to cover the bore such that the gas in the gas pipe expands the flexible film, a magnetic device received in the case to be moved by the flexible film, and a magnetic coil received in the case to generate the electrical signal because of a movement of the magnetic device.

2. The gas appliance as defined in claim 1, wherein the combustion controller is an ON/OFF valve connected to the gas pipe to turn on or turn off the gas flow.

3. The gas appliance as defined in claim 1, wherein the combustion controller is a proportional valve to adjust the gas flow.

4. The gas appliance as defined in claim 1, wherein the combustion controller is a blower to supply the combustor an air flow according to an optimal air-gas ratio.

5. The gas appliance as defined in claim 1, wherein the pressure gauge further includes a spring with opposite ends urging the case and the magnetic device respectively.

6. The gas appliance as defined in claim 1, wherein the case has a base having the bore and a lid, which engages the base, having a chamber therein to receive the magnetic device and the spring therein.

7. The gas appliance as defined in claim 6, wherein the lid has a main member with the chamber therein and a threaded hole and a knob engaging the threaded hole, and the spring has opposite ends urging the magnetic device and the knob that the magnetic device is adjusted by turning the knob.

* * * * *